United States Patent [19]

Barker

[11] 4,006,929
[45] Feb. 8, 1977

[54] VACUUM PAD
[75] Inventor: Loren B. Barker, Salem, Ill.
[73] Assignee: American Chain & Cable Company, Inc., Bridgeport, Conn.
[22] Filed: Dec. 17, 1975
[21] Appl. No.: 641,498
[52] U.S. Cl. .................. 294/64 R; 214/650 SG; 114/51; 269/21
[51] Int. Cl.[2] .............................. B66C 1/02
[58] Field of Search ........... 294/64 R, 64 A, 64 B, 294/65, 66 R, 86; 114/51; 248/362, 363; 269/21; 279/3; 214/650 SG, 1 BT, 1 BS

[56] References Cited
UNITED STATES PATENTS

| 1,729,131 | 9/1929 | Shaff | 269/21 |
| 3,005,652 | 10/1961 | Helm | 294/64 R |
| 3,704,679 | 12/1972 | Haynes et al. | 114/51 |
| 3,743,340 | 8/1973 | Williamann | 214/650 SG |

Primary Examiner—James B. Marbert
Attorney, Agent, or Firm—Barnes, Kisselle, Raisch & Choate

[57] ABSTRACT

A vacuum pad comprising a body having an opening therethrough. One end of the opening is adapted to be attached to a source of vacuum. A water trap chamber is provided on the body communicating with the opening. A cup of flexible material having a peripheral lip is mounted on the water trap chamber and has an opening therethrough providing communication between the interior of the water trap chamber and the space surrounded by the peripheral lip.

3 Claims, 2 Drawing Figures

VACUUM PAD

This invention relates to vacuum pads that are utilized for lifting articles by application of vacuum.

BACKGROUND OF THE INVENTION

In the handling of various articles particularly articles having planar surfaces, it is common to utilize vacuum pads. When the vacuum pads are utilized in an environment that has high moisture and low temperatures, a problem that often occurs is that the liquid on the surfaces of the articles to be lifted passes into the vacuum system and adversely affects the system as well as the lifting characteristics of the vacuum pad.

Accordingly, among the objects of the invention are to provide a vacuum pad which can be utilized in a moisture laden environment; wherein the moisture on the surface of the article being lifted will not adversely affect the pad; and wherein conventional vacuum pads can be readily adapted to incorporate the invention.

SUMMARY OF THE INVENTION

In accordance with the invention, a water trap chamber is interposed between the body of the vacuum pad and the cup so that moisture will be entrapped therein between the cup and the source of vacuum.

DESCRIPTION

Figure 1:
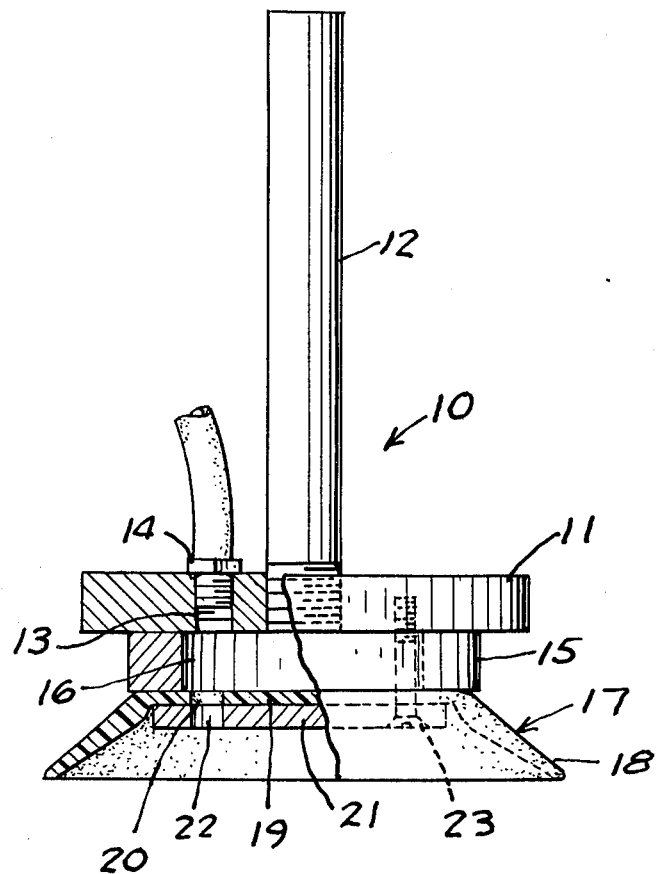
FIG. 1 is a part sectional elevational view of a vacuum pad embodying the invention.
Figure 2:
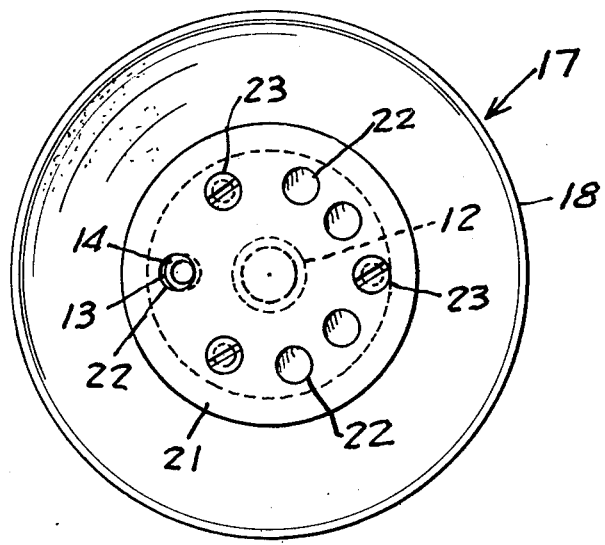
FIG. 2 is a plan view of the same.

Referring to FIG. 1, a vacuum pad 10 embodying the invention comprises a body 11 having a support 12 thereon and an opening 13 extending therethrough. One end of opening 13 is adapted to receive a coupling 14 extending to a source of vacuum.

In accordance with the invention, an annular member 15 is provided on the undersurface of the body 11 surrounding the opening 13 to define a chamber 16 associated with the opening.

A conventional cup 17 of flexible material is supported on the undersurface of the member 15 and includes an annular peripheral lip 18 and a central portion 19. The central portion 19 includes circumferentially spaced openings 20 communicating with chamber 16. The cup 17 is held in position by a scuff plate 21 engaging the central portion 19 having openings 22 therein aligned with openings 20. Screws 23 extend through the scuff 21 and central portion 19 and the interior of chamber 16 into the body 11.

In use, it has been found that when the vacuum pad is applied to the surface of an article which has moisture thereon, the moisture passes upwardly through the openings 22, 20 into the chamber 16 but does not pass from the chamber 16 into the opening 13. As a result, moisture removed from the surface beneath the cup is trapped in chamber 16 which is of sufficient capacity to store same and to prevent same from passing through the opening 13 into the vacuum system to adversely affect the vacuum system.

In accordance with the invention, conventional vacuum pads can be converted by interposing an annular member between the undersurface of body 11 and cup 17.

I claim:

1. In a vacuum pad, the combination comprising a body,
said body having an opening therethrough,
one end of said opening being adapted to be attached to a source of vacuum,
an annular member associated with said body and defining a water trap chamber communicating with said opening,
and a cup of flexible material having a peripheral lip and a central portion mounted on said chamber defining means and having a plurality of circumferentially spaced openings through said central portion providing communication between the interior of said water trap chamber and the space surrounded by said lip.

2. The combination set forth in claim 1 including a wear pad underlying said central portion and having openings therein aligned with the openings in said central portion.

3. In a vacuum pad, the combination comprising a body,
said body having an opening therethrough,
one end of said opening being adapted to be attached to a source of vacuum,
means associated with said body and defining a water trap chamber communicating with said opening,
a cup of flexible material having a peripheral lip mounted on said chamber defining means and having an opening therethrough providing communication between the interior of said water trap chamber and the space surrounded by said lip,
said cup including a central portion having said opening therein,
and a wear pad underlying said central portion and having openings therein aligned with the openings in said central portion.

* * * * *